US008829060B2

(12) United States Patent
Mickols et al.

(10) Patent No.: US 8,829,060 B2
(45) Date of Patent: Sep. 9, 2014

(54) SULFONATED POLY(ARYL ETHER) MEMBRANE INCLUDING BLEND WITH PHENOL COMPOUND

(75) Inventors: William E. Mickols, Chanhassen, MN (US); John C. McKeen, Hope, MI (US)

(73) Assignee: Dow Global Technologies LLC, Midland, MI (US)

( * ) Notice: Subject to any disclaimer, the term of this patent is extended or adjusted under 35 U.S.C. 154(b) by 290 days.

(21) Appl. No.: 13/400,634

(22) Filed: Feb. 21, 2012

(65) Prior Publication Data

US 2012/0225960 A1 Sep. 6, 2012

Related U.S. Application Data

(60) Provisional application No. 61/447,722, filed on Mar. 1, 2011.

(51) Int. Cl.
| | |
|---|---|
| *C08J 5/20* | (2006.01) |
| *B01D 69/02* | (2006.01) |
| *B01D 71/52* | (2006.01) |
| *C08L 71/00* | (2006.01) |
| *B01D 67/00* | (2006.01) |
| *C08K 5/13* | (2006.01) |
| *C08L 81/06* | (2006.01) |
| *C08G 65/48* | (2006.01) |
| *B01D 61/02* | (2006.01) |
| *C08L 71/12* | (2006.01) |

(52) U.S. Cl.
CPC ........... *B01D 71/52* (2013.01); *B01D 69/02* (2013.01); *B01D 61/025* (2013.01); *C08L 71/00* (2013.01); *B01D 67/0011* (2013.01); *C08G 2650/40* (2013.01); *C08K 5/13* (2013.01); *B01D 2325/20* (2013.01); *C08L 71/126* (2013.01); *C08L 81/06* (2013.01); *B01D 61/027* (2013.01); *C08G 65/48* (2013.01)
USPC ............................ 521/27; 528/125; 528/373

(58) Field of Classification Search
USPC ..................................... 521/27; 528/125, 373
See application file for complete search history.

(56) References Cited

U.S. PATENT DOCUMENTS

| | | | |
|---|---|---|---|
| 4,818,387 A | 4/1989 | Ikeda et al. | |
| 4,895,685 A | 1/1990 | Honda et al. | |
| 4,920,193 A | 4/1990 | Hann et al. | |
| 4,990,252 A | 2/1991 | Tomaschke et al. | |
| 5,067,971 A | 11/1991 | Bikson et al. | |
| 5,221,461 A * | 6/1993 | Henrici et al. | ........... 208/48 AA |
| 5,246,582 A | 9/1993 | Sluma et al. | |
| 5,693,740 A | 12/1997 | Colquhoun et al. | |
| 6,248,931 B1 | 6/2001 | Davis et al. | |
| 6,759,441 B1 | 7/2004 | Kerres et al. | |
| 6,887,408 B2 | 5/2005 | Yuan | |
| 7,132,496 B2 | 11/2006 | Kerres et al. | |
| 7,358,288 B2 | 4/2008 | Kerres | |
| 7,361,729 B2 | 4/2008 | McGrath et al. | |
| 7,368,526 B2 | 5/2008 | Yuan et al. | |
| 7,387,732 B2 | 6/2008 | Kerres et al. | |
| 7,550,216 B2 | 6/2009 | Ofer et al. | |
| 7,615,599 B2 | 11/2009 | Haering | |
| 7,790,837 B2 | 9/2010 | McGrath et al. | |
| 7,868,050 B2 | 1/2011 | Schindler et al. | |
| 7,882,963 B2 | 2/2011 | Mickols et al. | |
| 2006/0003210 A1 | 1/2006 | Ofer et al. | |
| 2007/0163951 A1 | 7/2007 | McGrath et al. | |
| 2008/0318134 A1 | 12/2008 | Kerres | |
| 2010/0051538 A1 | 3/2010 | Freeman et al. | |

FOREIGN PATENT DOCUMENTS

| | | |
|---|---|---|
| EP | 1149625 | 10/2001 |
| WO | 2007135689 | 11/2007 |

OTHER PUBLICATIONS

Lee et al., Synthesis and characterization of sulfonated poly(arylene thioethers)s and their blends with polybenzimidazole for proton exchange membranes, Journal of Membrane Science (2007), vol. 294, p. 75-83.

Lee et al., Segmented sulfonated poly(arylene ether sulfone)-b-polyimide copolymers for proton exchange membrane fuel cells. I. Copolymer synthesis and fundamental properties, Journal of Polymer Science, DOI: 10.102, 4879-4890, Jun. 2007.

Lee et al., Synthesis and characterization of poly(arylene ether sulfone)-b-polybenzimidazole copolymers for high temperature low humidity proton exchange membrane fuel cells, Polymer, 49 (2008), 5387-5396.

Park, et al., Highly Chlorine-tolerant polymers for desalination, Angewandte Chemie International Edition, 2008, 47: p. 6108-6113.

Wang, et al., Direct polymerization of sulfonated poly(arylene ether sulfone) random statistical copolymers: candidates for new proton exchange membranes, Journal of Membrane Science (2002), vol. 197, p. 231-242.

* cited by examiner

*Primary Examiner* — Shane Fang

(74) *Attorney, Agent, or Firm* — Edward W. Black

(57) ABSTRACT

A membrane comprising a blend of a sulfonated poly(aryl ether) and a phenol compound along with methods for making and using the same. Many additional embodiments are described including applications for such membranes.

15 Claims, No Drawings

SULFONATED POLY(ARYL ETHER) MEMBRANE INCLUDING BLEND WITH PHENOL COMPOUND

FIELD OF THE INVENTION

The present invention is generally directed toward poly(aryl ether) membranes along with methods for making and using the same.

DESCRIPTION OF THE RELATED ART

Poly(aryl ether) materials have been used as membranes for over thirty years, (e.g. see U.S. Pat. Nos. 4,818,387; 4,920,193 ; 4,990,252; 7,868,050; and EP 1149625). The open literature describes a wide variety of techniques for making various species of poly(aryl ethers) e.g. polysulfones, polyether ether ketone (PEEK), etc. along with techniques for post-sulfonation. U.S. Pat. No. 7,790,837 and 2007/0163951 describe a class of polysulfones formed by copolymerizing a pre-sulfonated sulfone monomer with non-sulfonated monomers resulting in a polysulfone copolymer with a random distribution of sulfonated segments.

While poly(aryl ethers) offer superior oxidative resistance, they generally provide lower flux and salt rejection performance as compared with commercial polyamide membranes. This performance gap is most evident in nano-filtration and reverse osmosis applications but applies more generally in other applications.

BRIEF SUMMARY OF THE INVENTION

The invention includes a membrane comprising a blend of a sulfonated poly(aryl ether) and a phenol compound along with methods for making and using the same. Many embodiments are disclosed including those which offer improved flux and/or salt rejection.

DETAILED DESCRIPTION OF THE INVENTION

The invention is not particularly limited to a specific type, construction or shape of membrane or application. For example, the present invention is applicable to flat sheet, tubular and hollow fiber forms including composite, anisotropic, isotropic, non-porous and porous structures. Such membranes may find utility in a variety of applications including pervaporation, gas separation, forward osmosis (FO), reverse osmosis (RO), nano filtration (NF), ultra filtration (UF) and micro filtration (MF) fluid separations. The invention is particularly useful for membranes designed for RO and NF separations. RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons.

The poly(aryl ethers) useful in the present invention are not particularly limited and include but are not limited to poly(aryl ether) sulfones, ketones, phosphine oxides and nitriles.

A preferred class of poly(aryl ethers) comprise a repeating unit comprising a subunit represented by Formula (I):

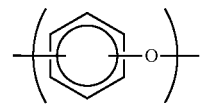

Formula (I)

A preferred subclass of poly(aryl ethers) comprise polysulfones, including species comprising a repeating unit comprising a subunit represented by Formula (II):

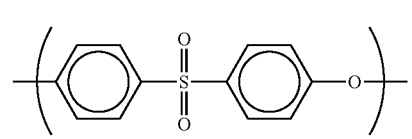

Formula (II)

Representative repeating units of applicable polysulfones are illustrated by Formulae (III-VIII):

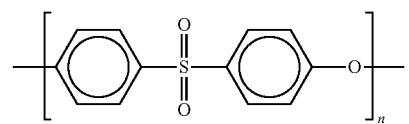

Formula (III)

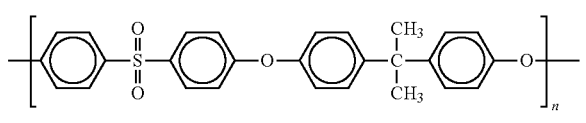

Formula (IV)

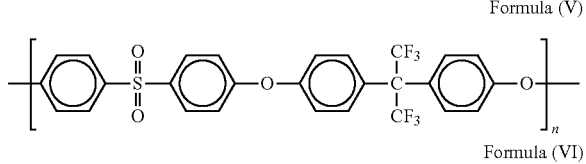

Formula (V)

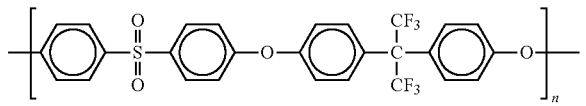

Formula (VI)

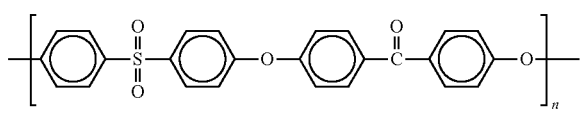

Formula (VII)

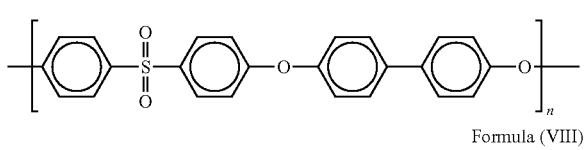

Formula (VIII)

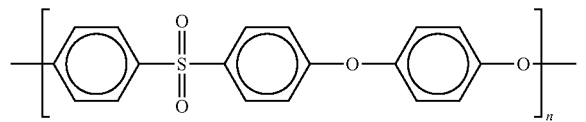

Another subclass of preferred poly(aryl ethers) comprise poly(ether ether ketones), including species comprising a repeating unit comprising a subunit represented by Formula (IX):

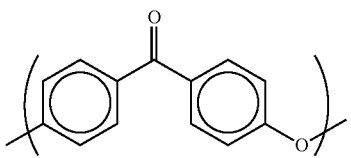

Formula (IX)

Another subclass of preferred poly(aryl ethers) comprise poly(aryl ether) phosphine oxides including species comprising a repeating unit comprising a subunit represented by Formula (X).

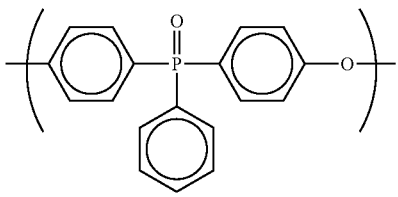

Formula (X)

Another subclass of preferred poly(aryl ethers) comprise poly(aryl ether) nitriles including species comprising a repeating unit comprising a subunit represented by Formula (XI).

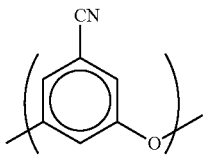

Formula (XI)

Applicable poly(aryl ethers) include homopolymers, copolymers and blends, e.g. blends with other non-(aryl ether) polymers such as polyalkylene oxides (e.g. polyethylene oxide) or multi-block copolymers based on poly(aryl ethers) and polybenzimidazole or anhydride terminated naphthalene based polyimides as described in: i) Lee et al., "Synthesis and characterization of poly(arylene ether sulfone)-b-polybenzimidazole copolymers for high temperature low humidity proton exchange membrane fuel cells," Polymer, 49 (2008), 5387-5396 and ii) Lee et al.,"Segmented sulfonated poly(arylene ether sulfone)-b-polyimide copolymers for proton exchange membrane fuel cells. I. Copolymer synthesis and fundamental properties," Journal of Polymer Science, DOI: 10.102, 4879-4890, respectively. Applicable poly(aryl ethers) also include copolymers or blends of a plurality of different species of poly(aryl ethers) including sulfonated and non-sulfonated species. Applicable poly(aryl ethers) may also be synthesized from fused ring monomers including phenolphthalein or naphthalene derivatives.

In preferred embodiments, the subject poly(aryl ethers) comprises at least 50 molar percent (and more preferably at least 75 molar percent) of repeating units that comprise the subunit represented by Formula (I). Preferred poly(aryl ethers) have a weight average molecular weight (Mw) of from about 5,000 to 500,000 and more preferably from 10,000 to 250,000.

From 5 to 50 molar percent (and more preferably from 10 to 25 molar percent) of the total number of phenyl groups of the subject poly(aryl ethers) preferably include sulfonic acid moieties, i.e.

—SO$_3$Z wherein Z is selected from: hydrogen, an alkali metal salt or a nitrogen containing salt derived from ammonium or amine. The addition of sulfonic acid moieties may be accomplished by well known post-sulfonation techniques, e.g. dissolving the poly(aryl ether) within a sulfonating solvent such as sulfuric acid, chlorosulfonic acid or other sulfonating agents, e.g. sulfur trioxide. More preferably, sulfonic acid moieties are added to the phenyl rings of a portion of the monomers used to prepare the poly(aryl ether), as represented below in Formula (XII) and as described in US 2007/0163951.

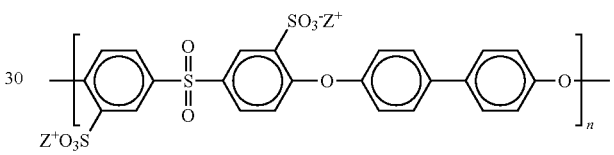

Formula (XII)

The degree of sulfonation can be determined by NMR techniques, infra-red spectroscopy or by titration, all of which are described in the literature and patent references cited above. While less preferred, the phenyl groups of the poly(aryl ether) may also include other substituent groups such as halogens, alkyls, amines, carboxylic acids, nitriles and hydroxyls. One preferred polysulfone is represented by Formula (XIII), hereinafter referred to as "BPS-20."

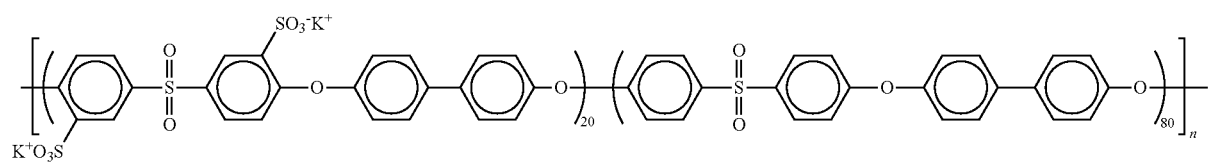

Formula (XIII)

The preparation of BPS-20 and similar polysulfones is described in US 2007/0163951. In brief, a di-sulfonated monomer (e.g. 3,3'-disulfonated-4,4'-dichlorodiphenyl sulfone) is directly polymerized with 4,4'-biphenol and a non-sulfonated sulfone monomer (e.g. 4,4'-dichlorodiphenyl sulfone) in stoichiometric ratios to achieve the desired degree of sulfonation.

The phenol compounds of the present invention are not particularly limited and different species may be used in combination. A preferred class of compounds is represented by Formula (XIV):

Formula (XIV)

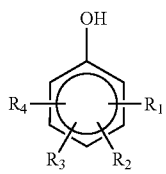

wherein $R_1$, $R_2$, $R_3$ and $R_4$ are independently selected from: alkoxy and alkyl having from 1 to 6 carbon atoms, amine, carboxylic acid, halogen, hydrogen, hydroxyl, nitro, phosphonate and thiol. The alkyl and alk portion of the alkoxy groups may be branched or unbranched, unsubstituted or substituted with hydroxyl, alkoxy, halogen, amine, nitro, phosphonate and thiol. In a preferred subset of embodiments, at least one of $R_1$, $R_2$, $R_3$ and $R_4$ is a hydroxyl. In another preferred subset of embodiments, at least one of $R_1$, $R_2$, $R_3$ and $R_4$ is hydrogen. In yet another subset of embodiments at least one of $R_1$, $R_2$, $R_3$ and $R_4$ is a hydroxyl and a hydrogen (e.g. dihydroxybenzene (o-, m-, p-)). In another subset of embodiments one of $R_1$, $R_2$, $R_3$ and $R_4$ is a hydroxyl and the remaining are selected from hydrogen and halogen. A preferred species is catechol, also known as pyrocatechol or 1,2-dihydroxybenzene.

The subject invention comprises blend of a sulfonated poly(aryl ether) and a phenol compound. The nature of the blend is not particularly limited. In preferred embodiments, the blend comprises a reaction product of a sulfonated poly(aryl ether) and a phenol compound. The term "reaction product" refers to a product resulting from a chemical reaction including the formation, rearrangement or destruction of a chemical bond. In a preferred embodiment, the term "reaction product" refers to product resulting from a chemical bond or attractive association formed between two compounds. As illustration, an idealized association between BPS-20 and catechol is represented in Formula (XV):

The technique for forming a blend or reaction product is not particularly limited and may be preformed by blending the sulfonated poly(aryl ether) and phenol compound together within a solvent such as N-methylpyrrolidone (NMP), dimethylformamide (DMF), dimethylacetamide (DMAc), dimethylsufoxide, dioxane, chloroform or tetrahydrofuran. In some applications, a non-solvent may also be included. Examples of applicable non-solvents include: alcohols, e.g., 2-methoxyethanol, t-amyl alcohol, methanol, 1-butanol, ethanol, water, acetone, methylethylketone, butyl ether, glycerol, diethyleneglycol and surfactants such as TWEEN, 20, 40, 60 and 80. The mixture may cast, extruded or otherwise formed into a membrane via a classic phase inversion process as is well known in the art. In some embodiments, the mixture may be cast or applied to a substrate such as a porous support to form a composite structure. The polysulfone may be in acid, base or salt form. It may also be pre-swollen via a variety of known techniques described in the literature cited above, including being boiled in acid.

The reaction product is preferably derived from a combination of sulfonated poly(aryl ether) to phenol compound in a weight ratio of from about 500:1 to 1:1, more preferably about 100:1 to 2:1 and in many embodiments from about 50:1 to 5:1.

In RO and NF applications, the porous support preferably includes pore sizes that are of sufficient size to permit essentially unrestricted passage of permeate but not large enough so as to interfere with the bridging over of the subject sulfonated polysulfone layer formed thereon. For example, the pore size of the support preferably ranges from about 0.001 to 0.5 micron. In some instances pore diameters larger than about 0.5 micron permit the sulfonated polysulfone membrane to sag into the pores and disrupt a flat sheet configuration. Examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

EXAMPLES

A first series of casting mixtures were prepared using 13.5 wt. % BPS-20 mixture dissolved in DMF (control). A second series of casting mixtures were prepared using the same BPS-20 mixture with an addition of catechol dissolved in DMF in an amount to yield a membrane having approximately 2 weight percent catechol per total weight of membrane, (i.e.

Formula (XV)

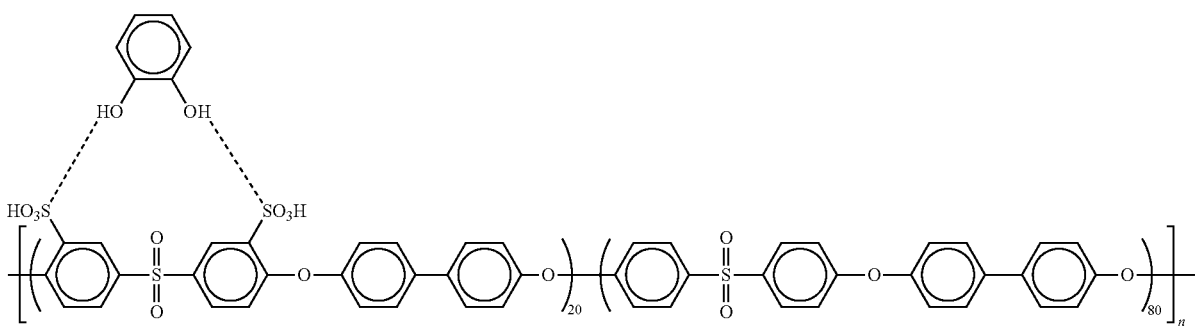

grams catechol/(grams catechol +BPS-20)). The resulting casting mixtures were thoroughly mixed, heated, cast at approximately 40-50° C. onto a clean glass plate using a 6 mil doctor blade and allowed to stand under an infrared heat lamp for approximately 12 hours. The samples were then transferred to a vacuum oven and dried at 90° C. for approximately 6 hours and left to cool to room temperature in a static vacuum for approximately 12 hours. The resulting sample membranes had thickness of approximately 11 μm. Coupons were cut from each sample membrane and a polyester web backing was applied to provide support. Sample coupons were tested in a test cell using a feed water including 2000 ppm NaCl at 600 psi. The flux (gfd) and salt passage (%) of the control membrane was 0.11±0.01 and 0.65±0.05, respectively; whereas membrane samples including catechol were 0.24±0.05 and 1.2±0.2, respectively.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The entire subject matter of each of the aforementioned patent documents are incorporated herein by reference.

What is claimed is:

1. A membrane comprising a blend of a sulfonated poly (aryl ether) and a phenol compound.

2. The membrane of claim 1 wherein the phenol compound is represented by the Formula (XIV):

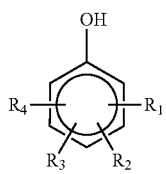

Formula (XIV)

wherein $R_1$, $R_2$, $R_3$ and $R_4$ are independently selected from: alkoxy and alkyl having from 1 to 6 carbon atoms, amine, carboxylic acid, halogen, hydrogen, hydroxyl, nitro, phosphonate and thiol.

3. The membrane of claim 2 wherein at least one of $R_1$, $R_2$, $R_3$ and $R_4$ are a hydroxyl and hydrogen.

4. The membrane of claim 2 wherein one of $R_1$, $R_2$, $R_3$ and $R_4$ is a hydroxyl and the remaining are selected from hydrogen and halogen.

5. The membrane of claim 1 wherein the phenol compound is catechol.

6. The membrane of claim 1 wherein the poly(aryl ether) comprises a repeating unit comprising a subunit represented by Formula (I):

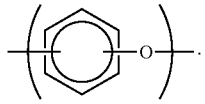

Formula (I)

7. The membrane of claim 1 wherein the poly(aryl ether) is selected from at least one of: poly(aryl ether) sulfones, poly (aryl ether) ketones, poly(aryl ether) phosphine oxides and poly(aryl ether) nitriles.

8. The membrane of claim 1 wherein the poly(aryl ether) comprises a repeating unit comprising a subunit represented by Formula (II):

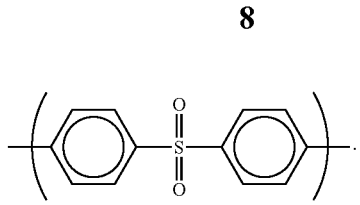

Formula (II)

9. The membrane of claim 1 wherein from 5 to 50 molar percent of the phenyl groups of the poly(aryl ether) include sulfonic acid moieties.

10. The membrane of claim 1 wherein the membrane is a nano-filtration or reverse osmosis membrane.

11. The membrane of claim 1 wherein the membrane comprises an anisotropic structure.

12. The membrane of claim 1 wherein the membrane comprises a composite structure.

13. The membrane of claim 1 wherein the blend is formed by combining the sulfonated poly(aryl ether) and phenol compound in a weight ratio of from 500:1 to 1:1.

14. A nanofiltration or reverse osmosis membrane comprising a reaction product of a sulfonated polysulfone and a phenol compound combined in a weight ratio of 100:1 to 2:1 wherein the phenol compound is represented by the Formula (XI):

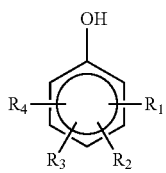

Formula (XI)

wherein $R_1$, $R_2$, $R_3$ and $R_4$ are independently selected from: alkoxy and alkyl having from 1 to 6 carbon atoms, amine, halogen, hydrogen, hydroxyl and thiol; and wherein the polysulfone comprises a repeating unit comprising a subunit represented by Formula (II):

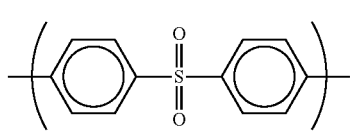

Formula (II)

wherein from 5 to 50 molar percent of the phenyl groups of the polysulfone include sulfonic acid moieties.

15. A method for making a membrane by combining a sulfonated poly(aryl ether) and a phenol compound with a solvent and casting or extruding the combination to form a membrane.

* * * * *